US010516797B2

(12) United States Patent
Agostinelli et al.

(10) Patent No.: US 10,516,797 B2
(45) Date of Patent: Dec. 24, 2019

(54) IMAGING DEVICE

(71) Applicant: FlexEnable Limited, Cambridge, Cambridgeshire (GB)

(72) Inventors: Tiziano Agostinelli, Cambridge (GB); Charlotte Harrison, Culham (GB); Will Reeves, Willingham (GB)

(73) Assignee: FlexEnable Limited (GB)

( * ) Notice: Subject to any disclaimer, the term of this patent is extended or adjusted under 35 U.S.C. 154(b) by 0 days.

(21) Appl. No.: 15/521,875

(22) PCT Filed: Oct. 26, 2015

(86) PCT No.: PCT/GB2015/053199
§ 371 (c)(1),
(2) Date: Apr. 25, 2017

(87) PCT Pub. No.: WO2016/067001
PCT Pub. Date: May 6, 2016

(65) Prior Publication Data
US 2017/0318179 A1    Nov. 2, 2017

(30) Foreign Application Priority Data

Oct. 27, 2014  (GB) .................................. 1419052.4

(51) Int. Cl.
*H04N 1/04*      (2006.01)
*H04N 1/028*     (2006.01)
(Continued)

(52) U.S. Cl.
CPC ........... *H04N 1/02835* (2013.01); *H04N 1/10* (2013.01); *H04N 1/1061* (2013.01); *H04N 1/195* (2013.01);
(Continued)

(58) Field of Classification Search
None
See application file for complete search history.

(56) References Cited

U.S. PATENT DOCUMENTS

| 8,531,625 B2 * | 9/2013 | Sohn .................... G02B 6/0036 349/61 |
| 2004/0046870 A1 * | 3/2004 | Leigh Travis ......... G02B 5/045 348/207.99 |

(Continued)

FOREIGN PATENT DOCUMENTS

| CN | 101460876 A | 6/2009 |
| CN | 201323623 Y | 10/2009 |

(Continued)

OTHER PUBLICATIONS

Office Action dated Aug. 25, 2017 in corresponding DE Application No. 11 2015 004 869.3.

(Continued)

*Primary Examiner* — Cheukfan Lee
(74) *Attorney, Agent, or Firm* — Knobbe, Martens, Olson & Bear, LLP

(57) ABSTRACT

An imager is provided. The imager has an imaging platen which presents an imaging surface against which an object to be imaged can be placed. The imaging platen has a photodetector layer and a light guiding layer operable to guide light towards the object. The imager includes a light source operable to emit light into the light guiding layer. The light source is located at an edge of the light guiding layer, to guide light into the light guiding layer of the imaging platen.

17 Claims, 4 Drawing Sheets

(51) Int. Cl.
*H04N 1/10* (2006.01)
*H04N 1/195* (2006.01)
*H04N 1/40* (2006.01)
*H04N 1/48* (2006.01)

(52) U.S. Cl.
CPC ......... H04N 1/40056 (2013.01); *H04N 1/484* (2013.01)

(56) References Cited

U.S. PATENT DOCUMENTS

| | | |
|---|---|---|
| 2005/0157519 A1 | 7/2005 | Kuo |
| 2005/0259436 A1 | 11/2005 | Wang et al. |
| 2006/0132423 A1* | 6/2006 | Travis .................. G02B 6/002 345/102 |
| 2008/0084708 A1* | 4/2008 | Lee ..................... G02B 6/0028 362/612 |
| 2008/0180754 A1 | 7/2008 | Miller et al. |
| 2010/0165419 A1 | 7/2010 | Kobako |
| 2011/0122460 A1* | 5/2011 | King .................. H04N 1/02815 358/474 |
| 2011/0122465 A1* | 5/2011 | King ...................... H04N 1/484 358/509 |
| 2012/0320310 A1* | 12/2012 | Adachi .................. G02B 5/045 349/64 |
| 2014/0098270 A1 | 4/2014 | Takahashi |

FOREIGN PATENT DOCUMENTS

| | | |
|---|---|---|
| CN | 102829390 A | 12/2012 |
| CN | 103443921 A | 12/2013 |
| WO | WO 2007/145973 A2 | 12/2007 |
| WO | WO 2010/002840 A2 | 1/2010 |

OTHER PUBLICATIONS

International Search Report dated Jan. 25, 2016 regarding corresponding International Application No. PCT/GB2015/053199.
Written Opinion of the International Searching Authority dated Jan. 25, 2016 2016 regarding corresponding International Application No. PCT/GB2015/053199.
Search Report dated Mar. 30, 2015 regarding corresponding Great Britain Application No. GB1419052.4.
Office Action dated Sep. 27, 2018 in related application No. CN 201580058742.2.

* cited by examiner

IMAGING DEVICE

CROSS-REFERENCE TO RELATED APPLICATIONS

This application is the U.S. National Phase under 35 U.S.C. § 371 of International Application No. PCT/GB2015/053199, filed Oct. 26, 2015, designating the United States and published in English on May 6, 2016, as WO 2016/067001, which claims priority to United Kingdom Application No, 1419052.4, filed Oct. 27, 2014.

FIELD

Embodiments described herein relate to devices for capturing digital images from physical representations, such as from sheets of paper.

BACKGROUND

Scanners perform the function of capturing digital images from representations printed on sheets of paper. Commercially available scanners can be heavy, bulky, non-portable, and fragile. Typically, a flatbed scanner comprises a planar glass platen, on one side of which an object document can be placed. Adjacent the other side of the glass platen, an elongate scanning element is, in use, swept in a plane parallel with the plane of the platen. A cover may be provided, hinged with respect to the glass platen, which is placed over the document, in use. The cover urges the document against the glass platen in use, to enable reliable image capture. An inside surface of the cover may be coated with a suitable material so as to present a white backdrop where the extent of the scanned sheet may not extend through the entire scanning range. The scanning element comprises a one dimensional array of photodetectors and a corresponding array of light emitters. As the scanning element is swept across the document to be scanned, the array of light emitters produces a strip of light which causes a swept illumination of the document, and the array of photodetectors detects an image of the document based on the swept illumination thereof. The sweeping movement of the scanning element is achieved using a scanning mechanism, driven for instance by a stepper motor. The need for a scanning mechanism to effect the sweeping movement of the scanning element in an accurate and repeatable manner, adds to weight, bulkiness and fragility.

Other configurations of flatbed scanners exist. For instance, the photodetection part of the scanning element may be repositioned in a stationary configuration, with reflected light from the scanned document being redirected to the stationary photodetectors by means of a mirror moving in unison with the scanning light source.

More portable scanners are also available. A hand-held wand scanner comprises an array of light emitters and photodetectors which, in use, is swept by hand past a document placed on a convenient surface, such as a desk. This is potentially problematic as it relies on the steadiness of hand of a user, to produce a reasonable image. Reference markers may be required on the scanned document to enable calibration of the resultant scan data. More than one attempt may be required to achieve a scan of acceptable quality. The wand scanner concept can be adapted into a feed-through configuration, whereby a mechanical document feeder is placed adjacent the light emitters and photodetectors, to urge a document on a feed path past the scanning element to enable a scan to be taken. Clearly, this attends to the unreliability of scanning associated with wand scanners, but it introduces a further limitation in that the feed mechanism will be incompatible with books or other bound or bulky documents. The feed mechanism will no doubt also impose width constraints on documents to be scanned—overly large documents will simply not fit, while unduly small documents may become misaligned and/or may jam in the feed mechanism.

DESCRIPTION OF SPECIFIC EMBODIMENTS

Figure 1:
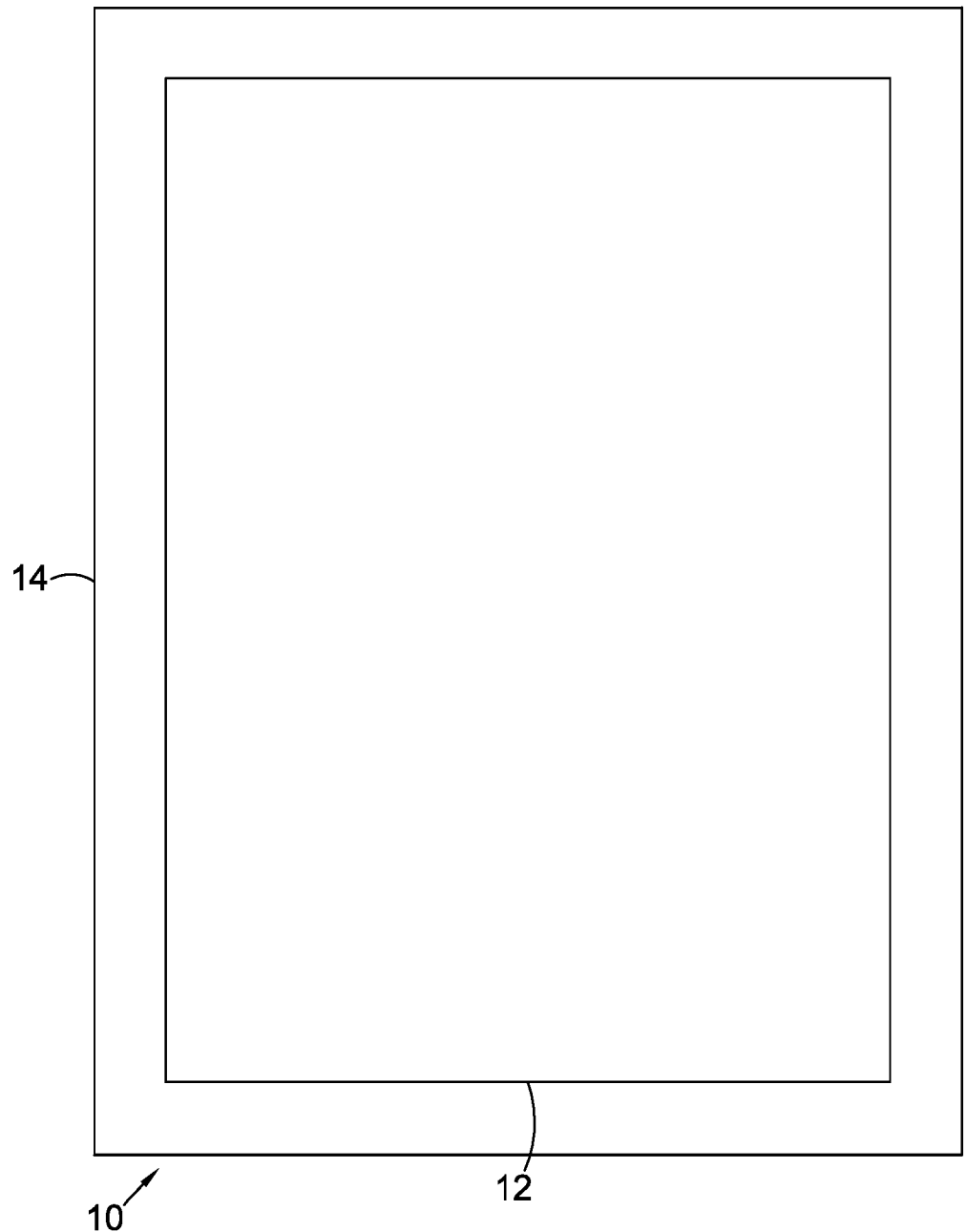
FIG. 1 is a top elevation of an imager in accordance with a described embodiment.
Figure 2:
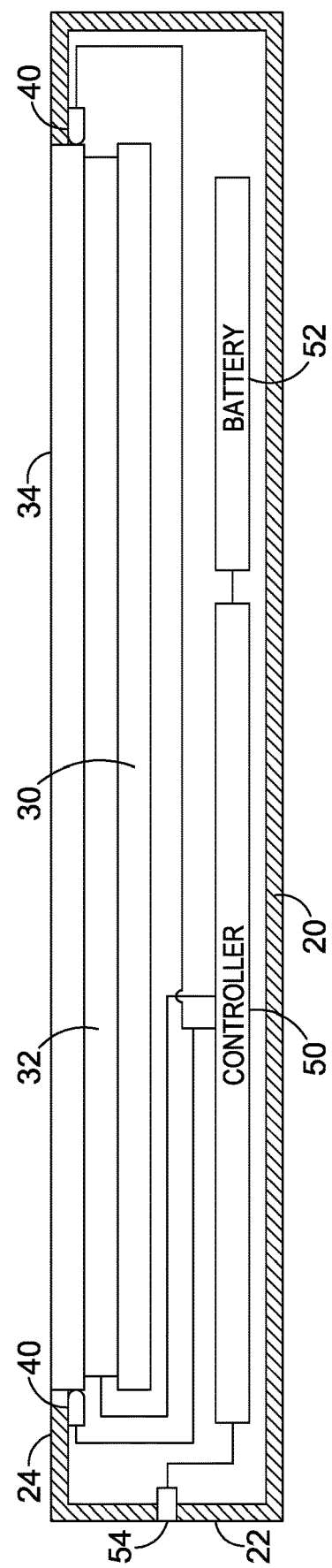
FIG. 2 is a cross section of the imager illustrated in FIG. 1.

As illustrated in FIG. 1, an imaging device 10 has a generally rectangular form, with a rectangular imaging platen 12 bounded by a corresponding casing 14. As indicated in FIG. 2, the casing 14 comprises a backplane 20, edge portions 22 and a front bezel 24 which engages with edges of the imaging platen 12 to form an enclosure. In one embodiment, the enclosure so formed is hermetically sealed to avoid ingress of foreign substances to the interior of the enclosure.

The imaging platen 12 is a multi-layered structure. FIG. 2 illustrates the layers. The thickness of the layers as illustrated in FIG. 2 is exaggerated to enable them to be distinguished clearly—the reader will appreciate that, in practice, the layers may be much thinner.

A backplane 30 provides mechanical support to the imaging platen 12, and also provides electrical connection to a layer of photodetectors 32 laminated over the backplane. An outer layer 34 of the imaging platen comprises a light guiding film. This film is laminated, during manufacture of the imaging platen 12, onto the layer of photodetectors 32.

The imaging platen 12 is mounted in the bezel 24 such that the exterior face of the imaging platen 12 is flush (coplanar) with the exterior face of the bezel 24.

The reader will appreciate that, in another embodiment, the imaging platen may not be co-planar with the exterior face of the bezel. The coplanar character of the described embodiment may be useful in the case where there is a desire to scan a document which is larger than the imaging platen.

As illustrated in FIG. 2, light emitting diodes (LEDs) 40 are positioned at edges of the light guiding film 34. In operation, the LEDs 40 serve to direct light into the light guiding film 34.

In other embodiments, alternative light sources, other than LEDs, may be used.

The arrangement shown in FIG. 2 also provides a controller 50 and a battery 52. The battery 52 provides electrical power to the controller 50 and, thence, to the active backplane 30, the photodetectors 32 and the LEDs 40. The controller 50 is electrically linked to a connector 54 mounted in an edge portion of the casing 14, so that the imager 10 can be connected, for example, to a computing device for exchange of data and/or program information, or to a power supply for recharging of the battery 52. To this end, the connector may, in certain embodiments, conform to a technical standard. Suitable standard specifications include USB, mini-USB, micro-USB or any other multi-pin connector. Alternatively, a bespoke, device specific, connector may be implemented.

The illustrated arrangement is schematic. The position of particular internal components of the imager 10 may be varied according to convenience. For example, in an alternative embodiment, the controller and battery could be positioned around the imaging platen, or for instance incorporated into a handle.

In one embodiment, the imager 10 may comprise wireless communications capabilities, so that the imager 10 can be placed in wireless communication with other devices. Suitable wireless communications facilities include those offered under the IEEE 802.11 series of standards, including those designated with the WiFi mark. Alternative wireless communications standards exist, including the Bluetooth standards.

In other embodiments, wired connection means could be provided, such as a USB communication port. There may also be a receptacle for receiving digital media, such as a memory card and, specifically, a card conformant with the Secure Digital (SD) standard.

The active backplane 30 provides a matrix for controlling the photodetectors. The matrix can be of organic or inorganic materials. The photodetectors are laminated or processed on top of the active matrix. The lamination of the light guiding film can be considered equivalent to the approach used when constructing a scintillator for an X-ray flat panel imagers.

One possible active matrix can be an active silicon matrix. If the active matrix is transparent, then the photodetectors can be arranged below the active matrix if this offers a production advantage.

In order to accommodate the possibility of use of the imager with a variety of different sized documents, the distribution of active photoelectric components across the imaging platen should be even.

It is desirable that the light guiding film is as thin as possible, to avoid impacting the scanner resolution. The thickness of the light guiding film acts to separate the active photoelectric components from the document to be imaged. As a non-prescriptive example, light guide films of 50 um are available from, for instance, FLEx Lighting II, LLC, of Chicago, Ill., USA (www.flexlighting.com).

Specific embodiments should take into account the desirability of ensuring that as much as possible of the light emitted by the LEDs is directed to the document to be imaged, and as little as possible is directed towards the photodetectors. The reader will appreciate that increased incidence of emitted light onto the photodetectors will reduce the contrast achievable in image capture. Three examples are now described to demonstrate how this desirable effect can be fulfilled.

Figure 3:
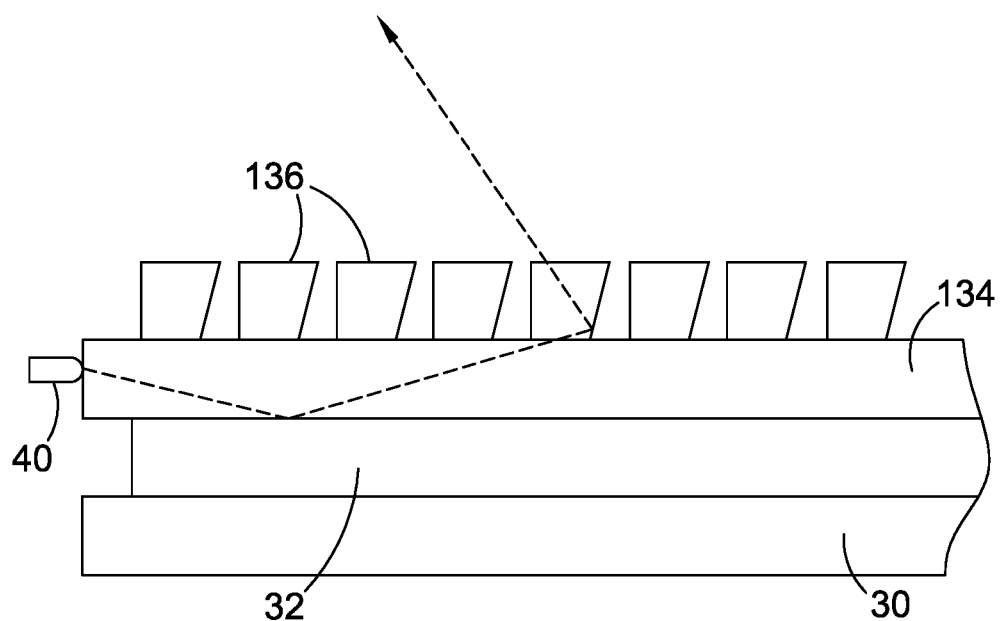
FIG. 3 is a cross section of a fragment of a platen of an imager in accordance with a second embodiment.

FIG. 3 illustrates a modification on the earlier described embodiment. FIG. 3 is a cross section of a portion of a platen, comprising a light directing film 134. In all other respects, the platen of FIG. 3 is the same as the embodiment of FIGS. 1 and 2.

The light directing film 134 of FIG. 3 is augmented with trapezoidal prisms 136. These prismatic features extend transverse of the direction of light emission by the LEDs. The actual size of these prisms will be much smaller than as illustrated in FIG. 3—the same consideration concerning the distance of the document from the active photo-electronics applies here too.

Each trapezoidal prism is defined by four extending faces and two end faces. Two of the extending faces are parallel. The narrower of the two parallel faces abuts the outer face of the light directing film 134. Each of the other two faces defines the same angle with respect to the parallel faces. The particular angle employed will depend on the refractive index of the light directing film and of the prism itself—to harness the effect of refraction and internal reflection to maximise the amount of light which is directed through the outer (wider) parallel faces of the prisms towards the document and to minimise the amount of light which is transmitted from the LEDs to the photodetectors without first being reflected from the document to be imaged.

In an alternative embodiment, in which light is directed into the platen only from one side as in FIG. 3, the angle of the rightmost face can be perpendicular to the imaging platen.

A broken line in FIG. 3 indicates an example ray of emitted light to show the pathway which can be designed with suitable material selection for refractive index and suitable angle to promote total internal reflection.

It should be noted that, in this example, the impact of introducing prismatic features in this way is twofold. Firstly, the spacing between the document to be imaged, and the photodetectors, is increased in comparison with the first described embodiment. This can be ameliorated by keeping the dimensions of the prismatic features as small as possible. This can be achieved using precision machining, such as diamond turning. It is acknowledged that it may be difficult to obtain very long trapezoidal prisms with such small features. Shorter trapezoidal prisms, arranged adjacent each other, would still operate effectively, as long as their axes are arranged substantially perpendicular to the emitted light.

Secondly, the pathway of light reflected from the document to be imaged will be affected by the interposed prismatic features. Light incident on the centre of a prism will transmit through and proceed to the photodetectors. Light incident off-centre may hit the angled side faces of the prisms, invoking total internal reflection (the light paths being reversible). This may reduce the precision of the image capture. However, suitable image processing may at least partly resolve this. Also, reducing the height of the prisms may reduce this effect, though doing so would reduce the benefit of including the prisms in terms of maintaining good contrast. The reader will appreciate that a balance can be struck between these two positions by means of optimisation. Finally, a higher density of prisms will allow higher pixel density images.

Figure 4:
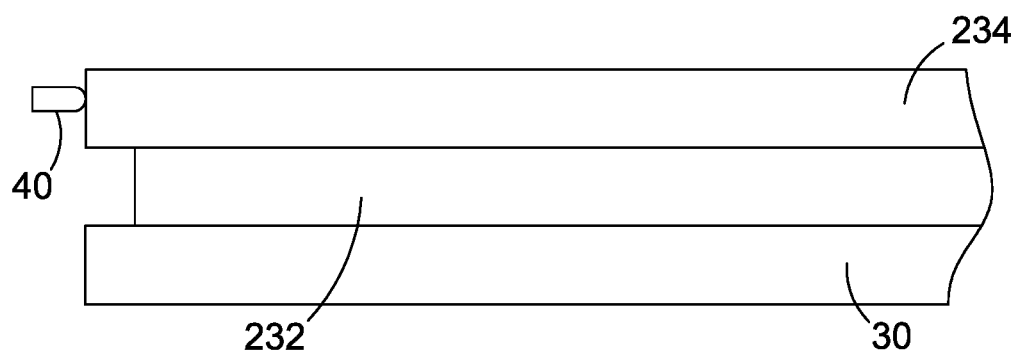
FIG. 4 is a cross section of a fragment of a platen of an imager in accordance with a third embodiment.

A third embodiment is illustrated in FIG. 4. In this embodiment, the previously described light guiding film is replaced by a film 234 which is capable of emitting polarised light. A polarizer 232 is interposed between the light guiding film and the photodetectors. The alignment of the polariser is such as to substantially block polarised light emitted directly from the light guiding film towards the photodetector layer. Light reflected from the document to be imaged will be scattered, which will at least in part destroy the polarisation of the light. Thus, a portion of the light reflected from the document will pass through the polariser. Naturally, the reader will appreciate that there will be loss associated with the absorption of light emitted by the light guiding film towards the polariser, and further loss associated with the absorption of light, reflected by the document, with a polarisation normal to the polarisation direction of the polariser. Both of these losses should be accounted for when selecting the intensity of light to be generated by the LEDs.

Figure 5:
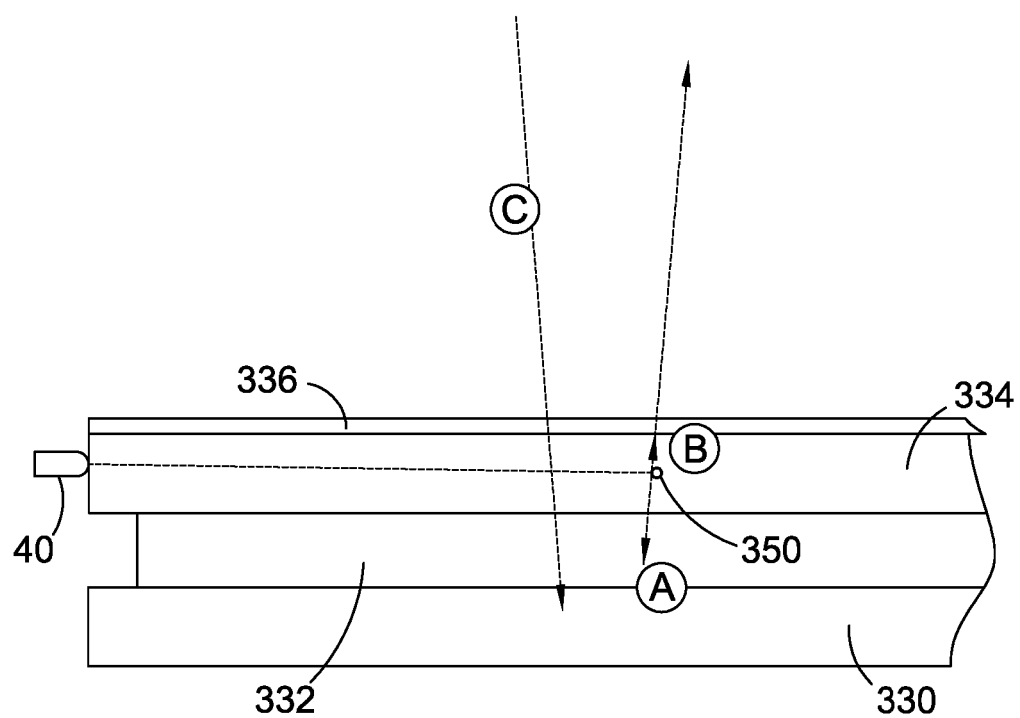
FIG. 5 is a cross section of a fragment of a platen of an imager in accordance with a fourth embodiment.

A fourth embodiment is illustrated in FIG. 5. In this embodiment, the photodetectors of the photodetector layer 330 are wavelength sensitive. A wavelength conversion layer 336 (such as a phosphor layer) is coated over the light guiding film 334, that is, on the side of the light guiding film 334 directed towards the document to be scanned in use. The light guiding film 334 is adulterated with scattering particles, which encourage the emanation of light from the light guiding film both above (towards the document, as illustrated) and below (towards the photodetectors, as illustrated).

The wavelength of the light introduced to the light guiding film is governed by the light source, i.e. the LEDs 40. The wavelength range of an LED is generally quite concentrated at a particular wavelength, to within around 5% of the central wavelength.

In this example, the phosphor is selected so as to luminesce at a wavelength spaced from the wavelength of the LEDs. By this, the light from the phosphor and the LED light are distinguishable. The photodetectors are attuned to the wavelength associated with the phosphor.

As illustrated, light from the LEDs will typically be scattered within the light guiding film by the scattering particles. One scattering particle 350 is illustrated, greatly exaggerated in size. Some of the scattered light, represented by ray A, will be directed towards the photodetector layer 330. This light will not be detected by the photodetectors, because the photodetectors are not attuned to the wavelength of the LED light. Another portion of the scattered light, represented by ray B, will be directed towards the phosphor, and will cause the emanation, in the same direction, of light with wavelength associated with the phosphor, towards the document. The light will then be reflected by the document. The reflected light (which, in reality, will be scattered, but is represented in FIG. 5 by ray C) is then incident on and passes through the phosphor. This light is detected by the photodetectors, which are attuned to the wavelength associated with the phosphor.

It will be appreciated by the reader that the phosphor layer needs to be engineered in such a way that incoming rays of light are converted into rays of light with different wavelength but same direction.

Photodetectors sensitive to different colours or filters may be used to detect coloured images. Alternatively, field sequential lighting, e.g. with LEDs flashing red, blue and green, may be used, thus making the use of colour filters redundant.

As illustrated, the imager is a stand-alone, function specific device. However, the described photodetecting capability could be integrated into a tablet or other hand-held electronic device, such as on the back plane of a tablet that already provides the controlling and digital image processing capabilities.

While certain embodiments have been described, these embodiments have been presented by way of example only, and are not intended to limit the scope of the inventions. Indeed, the novel methods, devices, and systems described herein may be embodied in a variety of other forms; furthermore, various omissions, substitutions and changes in the form of the methods, devices, and systems described herein may be made without departing from the spirit of the inventions. The accompanying claims and their equivalents are intended to cover such forms or modifications as would fall within the spirit and scope of the inventions.

What is claimed is:

1. An imager comprising:
    an imaging platen presenting an imaging surface, the imaging platen comprising a photodetector layer, a light guiding layer operable to guide light towards an object placed against the imaging platen, and a plurality of trapezoidal prisms on the light guiding layer, the plurality of trapezoidal prisms operable to direct light from the light guiding layer towards the object; and
    a light source operable to emit light into the light guiding layer;
    wherein the light source is located at an edge of the light guiding layer, to direct light into the light guiding layer of the imaging platen.

2. The imager in accordance with claim 1, further comprising an enclosure, enclosing a controller and presenting the imaging surface of the imaging platen for use.

3. The imager in accordance with claim 2, wherein the enclosure comprises a bezel bounding an edge of the imaging platen.

4. The imager in accordance with claim 3, wherein the bezel has an exterior surface which is flush with the imaging surface of the imaging platen.

5. The imager in accordance with claim 1, further comprising a controller operable to capture signals indicative of light detection at the photodetector layer.

6. The imager in accordance with claim 5, wherein the controller is operable to process light detection signals to form image data indicative of an image of a document.

7. The imager in accordance with claim 1, wherein the controller is operable to cause the light source to emit light, and is further operable to prime the photodetector layer to detect light corresponding to light emission.

8. The imager in accordance with claim 1, wherein the light source is a light emitting diode.

9. The imager in accordance with claim 8, wherein the light source is a plurality of light emitting diodes.

10. The imager in accordance with claim 1, wherein each of the trapezoidal prisms has two parallel faces, a narrower of which is adjacent the light guiding layer.

11. The imager in accordance with claim 10, wherein each of the trapezoidal prisms has two non-parallel faces, at least one of the non-parallel faces defining an angle with the parallel faces to induce total internal reflection of light entering the prism from the light guiding layer.

12. The imager in accordance with claim 1, wherein the imaging platen is operable to emit, from the light guiding layer, substantially polarised light, and the imaging platen further comprises a polarising layer interposed between the light guiding layer and the photodetector layer operable to absorb polarised light from the light guiding layer.

13. The imager in accordance with claim 1, wherein the light guiding layer comprises scattering particles operable to cause light emanating from the light source to be scattered.

14. The imager in accordance with claim 1, wherein the imaging platen comprises a wavelength conversion layer, the wavelength conversion layer being operable to emit light of a specific wavelength band in response to light incident thereon, wherein the photodetector layer is attuned to said specific wavelength band, and wherein the light source is operable to emit light out with said specific wavelength band, such that the photodetector layer can distinguish between light emitted by the light source and light reflected by an imaged document, in use, and wherein the wavelength conversion comprises a phosphor.

15. The imager in accordance with claim 1, wherein the photodetector layer is operable to detect light at a plurality of wavelengths, allowing collection of image information for the capture of a colour image.

16. The imager in accordance with claim 15, wherein the photodetector layer comprises a plurality of photodetectors, a first portion of the photodetectors being sensitive to a first wavelength of light, a second portion of the photodetectors being sensitive to a second wavelength of light and a third portion being sensitive to a third wavelength of light, the first, second and third wavelengths forming an additive colour system, and wherein the photodetector layer comprises a colour filter array imposed over the photodetectors so as to render said photodetectors sensitive to particular ones of the first, second and third wavelengths.

17. The imager in accordance with claim 1, wherein the light source is operable to emit, sequentially, light centered on first, second and third wavelengths, forming an additive colour system, the photodetector layer being correspondingly operable to capture, sequentially, component images for use in constructing an additive colour image.

* * * * *